(12) United States Patent
Hirai et al.

(10) Patent No.: US 12,395,714 B2
(45) Date of Patent: Aug. 19, 2025

(54) INFORMATION COLLECTION APPARATUS AND CONTROL METHOD

(71) Applicant: CANON KABUSHIKI KAISHA, Tokyo (JP)

(72) Inventors: Yuichi Hirai, Tokyo (JP); Yasushi Ohwa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 180 days.

(21) Appl. No.: 18/493,849

(22) Filed: Oct. 25, 2023

(65) Prior Publication Data

US 2024/0171832 A1    May 23, 2024

(30) Foreign Application Priority Data

Nov. 21, 2022 (JP) ................................. 2022-185750

(51) Int. Cl.
*H04N 23/23* (2023.01)
*G01J 5/00* (2022.01)
*G01J 5/48* (2022.01)

(52) U.S. Cl.
CPC ................ *H04N 23/23* (2023.01); *G01J 5/48* (2013.01); *G01J 2005/0077* (2013.01); *G01J 2005/0092* (2013.01)

(58) Field of Classification Search
None
See application file for complete search history.

(56) References Cited

U.S. PATENT DOCUMENTS

| | | | |
|---|---|---|---|
| 9,894,339 B2 | 2/2018 | Ohwa | |
| 10,223,031 B2 | 3/2019 | Ohwa | |
| 2015/0323211 A1* | 11/2015 | Abiprojo | F24F 11/30 236/1 C |
| 2019/0316799 A1* | 10/2019 | Bharatia | G06N 3/08 |
| 2020/0217723 A1* | 7/2020 | Chen | G01K 1/143 |
| 2022/0313095 A1* | 10/2022 | Lichtensztein | A61B 5/0017 |
| 2023/0342946 A1 | 10/2023 | Ohwa | |

FOREIGN PATENT DOCUMENTS

| | | |
|---|---|---|
| JP | 2022-035519 A | 3/2022 |
| WO | 2020105161 A1 | 5/2020 |

* cited by examiner

*Primary Examiner* — Stefan Gadomski
(74) *Attorney, Agent, or Firm* — Carter, DeLuca & Farrell LLP

(57) ABSTRACT

An information collection apparatus communicates with an external apparatus, acquires first information relating to a use environment of the apparatus and second information corresponding to a target for the inference processing, executes inference processing by applying the second information and third information set on a basis of the first information to the learned model, and sets the third information on a basis of a range of a first threshold of the first information. When the first information is within a range of a second threshold, the third information is selected on a basis of the range of the first threshold of the first information. When the first information is not within the range of the second threshold, the third information is acquired from the external apparatus via the communication unit so that the first information is within the range of the second threshold.

13 Claims, 11 Drawing Sheets

FIG. 3A

| LABEL | TEMPERATURE RANGE | EXISTENCE/ NONEXISTENCE | STORAGE LOCATION |
|---|---|---|---|
| param_00 | $-50<t\leq-45$ | not exist | invalid |
| param_01 | $-45<t\leq-40$ | not exist | invalid |
| param_02 | $-40<t\leq-35$ | not exist | invalid |
| param_03 | $-35<t\leq-30$ | not exist | invalid |
| param_04 | $-30<t\leq-25$ | not exist | invalid |
| param_05 | $-25<t\leq-20$ | not exist | invalid |
| param_06 | $-20<t\leq-15$ | not exist | invalid |
| param_07 | $-15<t\leq-10$ | not exist | invalid |
| param_08 | $-10<t\leq-5$ | not exist | invalid |
| param_09 | $-5<t\leq0$ | not exist | invalid |
| param_10 | $0<t\leq5$ | not exist | invalid |
| param_11 | $5<t\leq10$ | existing | addr_0 |
| param_12 | $10<t\leq15$ | existing | addr_1 |
| param_13 | $15<t\leq20$ | existing | addr_2 |
| param_14 | $20<t\leq25$ | existing | addr_3 |
| param_15 | $25<t\leq30$ | existing | addr_4 |
| param_16 | $30<t\leq35$ | not exist | invalid |
| param_17 | $35<t\leq40$ | not exist | invalid |
| param_18 | $40<t\leq45$ | not exist | invalid |
| param_19 | $45<t\leq50$ | not exist | invalid |

FIG. 3B

| NAME | TEMPERATURE RANGE | STORAGE LOCATION |
|---|---|---|
| param_11 | $5<t\leq10$ | addr_0 |
| param_12 | $10<t\leq15$ | addr_1 |
| param_13 | $15<t\leq20$ | addr_2 |
| param_14 | $20<t\leq25$ | addr_3 |
| param_15 | $25<t\leq30$ | addr_4 |

FIG. 3C

| NAME | TEMPERATURE RANGE | STORAGE LOCATION |
|---|---|---|
| param_12 | $10<t\leq15$ | addr_1 |
| param_13 | $15<t\leq20$ | addr_2 |
| param_14 | $20<t\leq25$ | addr_3 |
| param_15 | $25<t\leq30$ | addr_4 |
| param_16 | $30<t\leq35$ | addr_0 |

FIG. 6A

TEMPERATURE RANGE FOR EACH LEARNED PARAMETER (FIRST THRESHOLD RANGE)

TEMPERATURE RANGE OF THRESHOLD TABLE STORED IN MEMORY (FROM UPPER LIMIT TO LOWER LIMIT OF SECOND THRESHOLD RANGE)

| TEMPERATURE RANGE | ... | -10<t≤-5 | -5<t≤0 | 0<t≤5 | 5<t≤10 | 10<t≤15 | 15<t≤20 | 20<t≤25 | 25<t≤30 | 30<t≤35 | 35<t≤40 | ... |
|---|---|---|---|---|---|---|---|---|---|---|---|---|
| LEARNED PARAMETER | | | | | param_11 | param_12 | param_13 | param_14 | param_15 | | | |
| STORAGE LOCATION | | | | | addr_0 | addr_1 | addr_2 | addr_3 | addr_4 | | | | tr = 10°C, tr = 10°C, t = 19°C, t = 21°C

FIG. 6B

TEMPERATURE RANGE FOR EACH LEARNED PARAMETER (FIRST THRESHOLD RANGE)

TEMPERATURE RANGE OF THRESHOLD TABLE STORED IN MEMORY (FROM UPPER LIMIT TO LOWER LIMIT OF SECOND THRESHOLD RANGE)

| TEMPERATURE RANGE | ... | -10<t≤-5 | -5<t≤0 | 0<t≤5 | 5<t≤10 | 10<t≤15 | 15<t≤20 | 20<t≤25 | 25<t≤30 | 30<t≤35 | 35<t≤40 | ... |
|---|---|---|---|---|---|---|---|---|---|---|---|---|
| LEARNED PARAMETER | | | | | | param_12 | param_13 | param_14 | param_15 | param_16 | | |
| STORAGE LOCATION | | | | | | addr_1 | addr_2 | addr_3 | addr_4 | addr_0 | | | trL = 10°C, trH = 7°C, t = 26°C, t = 29°C

INFORMATION COLLECTION APPARATUS AND CONTROL METHOD

BACKGROUND OF THE INVENTION

Field of the Invention

The present invention relates to artificial intelligence (AI) processing according to the use environment of an edge device.

Description of the Related Art

In the field of the Internet of Things (IOT), information collection apparatuses such as surveillance cameras are connected to a network such as the Internet as an edge device, artificial intelligence (AI) processing is executed by applying the information collected by the edge device to a learned model in the edge device, and the product is transmitted to a cloud server or the like.

In International Publication 2020/105161, switching learned models in the edge device depending on the use environment of the edge device is described. Also, in Japanese Patent Laid-Open No. 2022-035519, recognizing a person using AI processing from a thermal image captured with an infrared camera is described.

In a case such as in Japanese Patent Laid-Open No. 2022-035519 where an object is recognized using AI processing from a thermal image captured with an infrared camera, the surface temperature of the object is affected by the use environment (outside air temperature, environment temperature, and the like) of the infrared camera. Thus, the use environment of the infrared camera must be taken into account.

AI processing that takes into account the use environment of the edge device is referred to as multimodal AI processing. Compared to single-modal AI processing which processes one type of information such as thermal images collected by an edge device, multimodal AI processing processes a combination of a plurality of types of information such as thermal images, the use environment of the edge device, and the like.

Multimodal AI processing increases the processing load as the information input into the learned model is increased. For example, in a case where the information relating to the use environment of the edge device is temperature information from at the time of video shooting, temperature information that is out of sync with the shooting needs to be acquired for each frame of the video, increasing the processing load.

Also, storing learned models and learned parameters according to various use environments in the edge device requires a large storage capacity, which leads to an increase in cost. Furthermore, as in International Publication 2020/105161, a learned model according to the use environment of the edge device can also be downloaded from an external server or the like, but when changing the learned model, the AI processing must be stopped.

SUMMARY OF THE INVENTION

The present invention has been made in consideration of the aforementioned problems, and realizes techniques relating to AI processing taking into account the use environment of an edge device for avoiding an increase in costs due to an increase in the amount of information used in the AI processing and avoiding stoppage of the AI processing to acquire information used in the AI processing.

In order to solve the aforementioned problems, the present invention provides an information collection apparatus that executes inference processing using a learned model, comprising: a communication unit that communicates with an external apparatus; a first acquisition unit that acquires first information relating to a use environment of the information collection apparatus; a second acquisition unit that acquires second information corresponding to a target for the inference processing; a processing unit that executes the inference processing by applying the second information and third information set on a basis of the first information to the learned model; and a control unit that sets the third information on a basis of a range of a first threshold of the first information, wherein, in a case where the first information is within a range of a second threshold, the control unit selects the third information on a basis of the range of the first threshold of the first information, and in a case where the first information is not within the range of the second threshold, the control unit acquires the third information from the external apparatus via the communication unit so that the first information is within the range of the second threshold.

In order to solve the aforementioned problems, the present invention provides a method of controlling an information collection apparatus which executes inference processing using a learned model, wherein the information collection apparatus includes a communication unit that communicates with an external apparatus, a first acquisition unit that acquires first information relating to a use environment of the information collection apparatus, and a second acquisition unit that acquires second information corresponding to a target for the inference processing, wherein the method comprises setting third information to be applied to the learned model on a basis of a range of a first threshold of the first information; and executing the inference processing by applying the second information and the third information to the learned model, and wherein the setting includes, in a case where the first information is within a range of a second threshold, the third information being selected on a basis of the range of the first threshold of the first information, and in a case where the first information is not within the range of the second threshold, the third information being acquired from the external apparatus via the communication unit so that the first information is within the range of the second threshold.

In order to solve the aforementioned problems, the present invention provides a non-transitory computer-readable storage medium storing a program for causing a computer to function as an information collection apparatus that executes inference processing using a learned model, comprising: a communication unit that communicates with an external apparatus; a first acquisition unit that acquires first information relating to a use environment of the information collection apparatus; a second acquisition unit that acquires second information corresponding to a target for the inference processing; a processing unit that executes the inference processing by applying the second information and third information set on a basis of the first information to the learned model; and a control unit that sets the third information on a basis of a range of a first threshold of the first information, wherein, in a case where the first information is within a range of a second threshold, the control unit selects the third information on a basis of the range of the first threshold of the first information, and in a case where the first information is not within the range of the second threshold, the control unit acquires the third information from the external apparatus via the communication unit so that the first information is within the range of the second threshold.

According to the present invention, in AI processing taking into account the use environment of an edge device, an increase in costs due to an increase in the amount of information used in the AI processing and stoppage of the AI processing to acquire information used in the AI processing can be avoided.

Further features of the present invention will become apparent from the following description of exemplary embodiments (with reference to the attached drawings).

BRIEF DESCRIPTION OF THE DRAWINGS

FIGS. 3A to 3C are diagrams illustrating examples of threshold table configurations according to the first embodiment.

FIGS. 6A and 6B are diagrams for describing an update determination method for a threshold table and a change determination method for a learned parameter according to the first embodiment.

DESCRIPTION OF THE EMBODIMENTS

Figure 1:
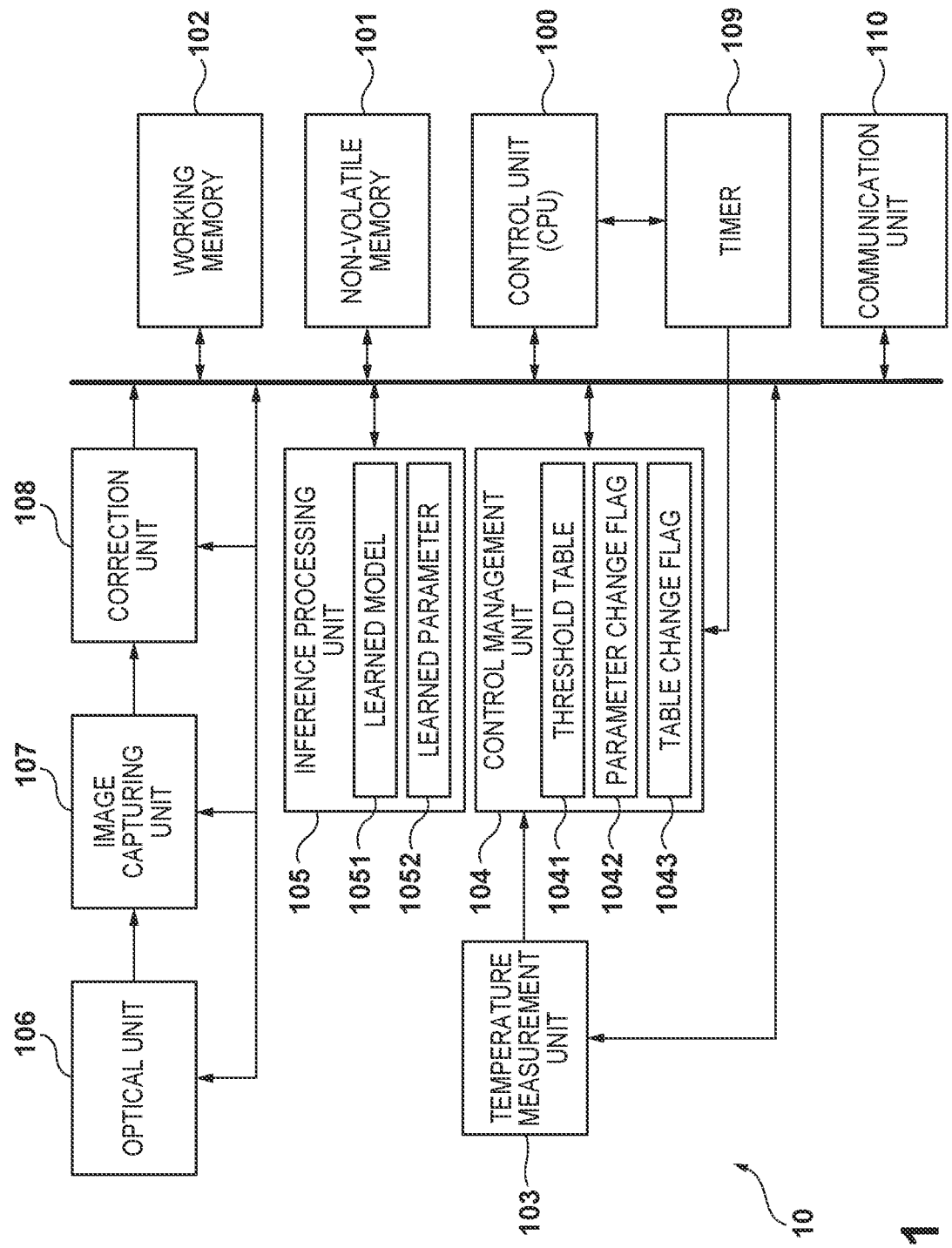
FIG. 1 is a block diagram illustrating an apparatus configuration according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The first embodiment described below is an example of an information collection apparatus according to the present invention applied to an image capture apparatus capable of shooting still images and video.

In the present embodiment, the image capture apparatus including a microbolometer captures a far-infrared light image (hereinafter referred to as a thermal image), image recognition processing (hereinafter referred to as AI processing) is executed by applying a learned parameter according to the captured thermal image and the use environment (outside air temperature and environment temperature) of the image capture apparatus to a learned model acquired via a learning processing using artificial intelligence (AI) machine learning and deep learning, and a product such as an object detection result is output. Also, in the present embodiment, the outside air temperature and the environment temperature (hereinafter referred to as temperature) is determined as the use environment of the image capture apparatus, and the learned parameter changes depending on the use environment (at each predetermined temperature range).

The image capture apparatus according to the present embodiment, for example, is a surveillance camera which is a type of Web camera referred to as an edge device connected to a network such as the Internet, and the surveillance camera has a function of executing AI processing on thermal images and detecting the faces of people from the thermal images. Note that in the present embodiment, a common learned model is used in the image recognition processing and the learned parameter applied to the learned model is changed.

The image capture apparatus according to the present embodiment can detect a person using image recognition processing from the captured thermal image and can connected to a network as an edge device and monitor the behavior from a remote location.

Apparatus Configuration

First, the configuration and functions of an image capture apparatus 10 according to the present embodiment will be described with reference to FIG. 1.

The image capture apparatus 10 according to the present embodiment can be applied to a web camera or network camera, an onboard camera, a surveillance camera, a medical camera, a smart speaker with a camera function, and the like communicably connectable via a network as an edge device.

The image capture apparatus 10 according to the present embodiment captures a far-infrared light image via a thermal detector such as a microbolometer and generates a thermal image of a target of AI processing.

A control unit 100 includes a processor such as a CPU that executes arithmetic processing for controlling the entire image capture apparatus 10 and implements the control processing described below by the processor executing a program stored in a non-volatile memory 101 described below. The control unit 100 may directly execute a program read out from the non-volatile memory 101 or may load a program read out from the non-volatile memory 101 on a working memory 102 and execute it to achieve a high processing speed. Note that instead of the control unit 100 controlling the entire apparatus, a plurality of hardware may share the processing to control the entire apparatus.

The non-volatile memory 101 is a memory which is electrically erasable and recordable, such as flash ROM, for example. Constants, programs, and the like for operation of the control unit 100 are recorded in the non-volatile memory 101. Herein, programs refer to programs for executing the control processing described below in the present embodiment. Also, the non-volatile memory 101 records thermal image data captured by an image capturing unit 107 described below and processed by a correction unit 108. The working memory 102 is a memory capable of accessing a large amount of data at higher speeds than a flash ROM, and DRAM or the like is used, for example. Constants and variables for operation of the control unit 100 and programs read out from the non-volatile memory 101 are loaded on the working memory 102 used as a work area. Also, the working memory 102 may be used as a buffer memory that temporarily stores thermal image data captured by the image capturing unit 107 described below and processed by the correction unit 108, thermal image data currently being processed by the correction unit 108, and the like.

Figure 8:
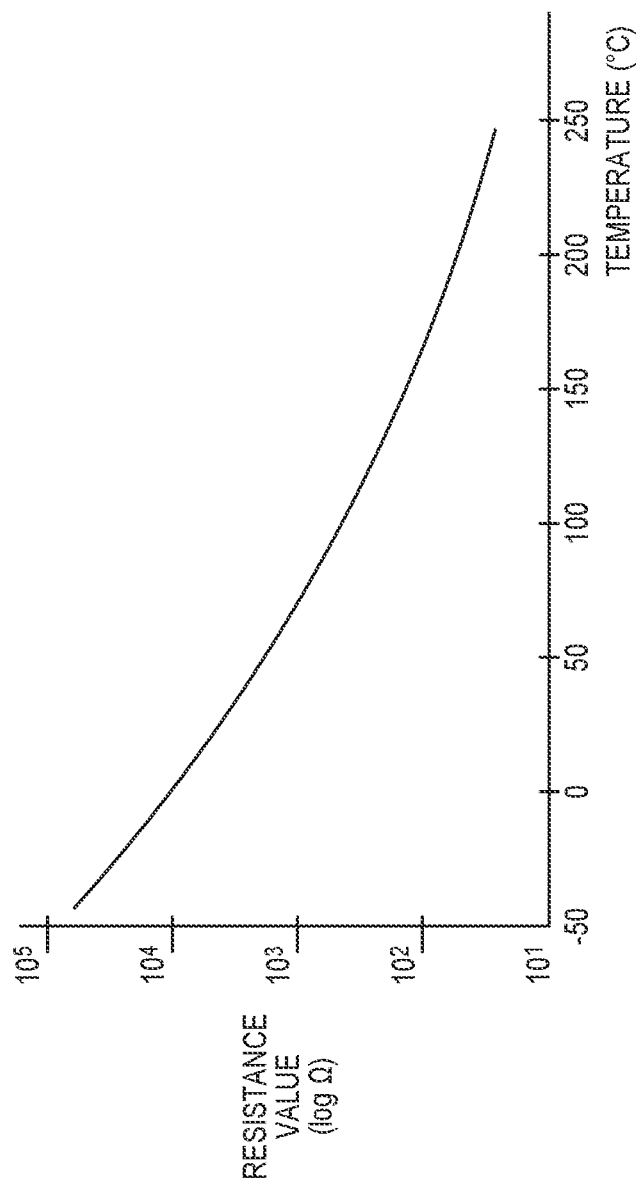
FIG. 8 is a diagram illustrating an example of the relationship between temperature of an NTC thermistor and resistance value according to the first embodiment.

A temperature measurement unit 103 is a temperature sensor that measures the outside air temperature or environment temperature surrounding in the image capture apparatus 10 and outputs the measured temperature information to a control management unit 104. The temperature measurement unit 103 is used as a thermistor or a type of thermistor known as a negative temperature coefficient (NTC) thermistor, for example. An NTC thermistor has the characteristic of the resistance value decreasing with increasing temperature and can be used in a wide temperature range from −50° C. to greater than 200° C., which includes the temperature range in accordance with the use environment of the image capture apparatus 10 according to the present embodiment. FIG. 8 illustrates the relationship between detected temperature and resistance value for an NTC thermistor. In a case where temperature surrounding the image capture apparatus 10 and the temperature surrounding the object are substantially the same or the correlation between the two can be obtained, the temperature measurement unit 103 may be attached to a housing forming the outer cover portion of the image capture apparatus 10. Also, in a case where the temperature measurement unit 103 is attached to the outer cover portion of the image capture apparatus 10 in contact with the outside air, the temperature measurement unit 103 may be covered with a protective member (not illustrated) to accommodate for the effects of direct sunlight, poor weather (adhesion of rain, hail, or frost), and the like. Also, the temperature measurement unit 103 may be disposed separated from the housing of the image capture apparatus 10. The temperature measurement unit 103 is not limited by the present embodiment.

The control management unit 104 acquires the temperature information from the temperature measurement unit 103 and manages the control data such as tables and flags for when executing the AI processing in an inference processing unit 105 described below. The control management unit 104 includes a threshold table 1041 described below using FIGS. 3A to 3C, a parameter change flag 1042 described below using FIG. 4, and a table change flag 1043 described below using FIG. 5 and changes and updates the parameters and temperature ranges, sets and resets the flags, and the like. The control management unit 104 includes a storage area for storing the threshold table 1041, the parameter change flag 1042, and the table change flag 1043. The table 1041 and the flags 1042 and 1043 may not be managed by the control management unit 104 but be stored in the non-volatile memory 101, loaded onto the working memory 102 from the non-volatile memory 101 when the activation processing of the image capture apparatus 10 is executed, and managed by the control management unit 104 accessing the working memory 102.

The inference processing unit 105 includes a learned model 1051 and a learned parameter 1052. The inference processing unit 105 includes a storage area for storing the learned model 1051 and the learned parameter 1052. The learned model 1051 and the learned parameter 1052 may be not managed by the inference processing unit 105 but be stored in the non-volatile memory 101, loaded onto the working memory 102 from the non-volatile memory 101 when the activation processing of the image capture apparatus 10 is executed, and managed by the inference processing unit 105 accessing the working memory 102.

The learned model 1051 is constituted by a neural network, for example. The inference processing unit 105 executes AI processing by applying the thermal image captured by the image capturing unit 107 described below and the learned parameter 1052 set by the control management unit 104 to the learned model 1051 and outputting an object detection result. The object to be detected is the face, the body, or an organ such as the pupil of a person, for example. Note that the AI processing may be executed by a graphics processing unit (GPU). A GPU is a processor capable of executing processing specific for computer graphic calculations and has sufficient calculation processing power to perform the matrix operations required for the AI processing and the like in a short amount of time. Note that for the AI processing, the control unit 100 and the GPU may cooperate to perform calculations or only the control unit 100 or the GPU may perform calculations.

An optical unit 106 includes a lens that allows far-infrared light (of a wavelength range from 8 μm to 14 μm, for example) to pass through and forms an image in the image capturing unit 107. Lenses that allow visible light to pass through contain, as a main component, silica (SiO2) which absorbs far-infrared light. Thus, a germanium or chalcogen compound is used as the material for the lens that allows far-infrared light to pass through.

The image capturing unit 107 includes a thermal detector such as a microbolometer with a focal plane array (FPA) in which light-receiving elements that react to far-infrared light are arranged in a two-dimensional pattern. The microbolometer captures a thermal image by converting an increase in the temperature due to the light-receiving elements receiving far-infrared light into an electrical signal (voltage) as a change in resistance value. The thermal image is captured at a predetermined frame rate (for example, 30 Hz). The number of pixels of the thermal image is equal to or greater than the VGA size (640 pixels horizontally by ×480 lines vertically) and corresponds to a sufficient resolution for the AI processing.

The thermal image obtained by the microbolometer reproduces the temperature of the object surface as an intensity distribution. The surface temperature of the object is affected by the outside air temperature and the environment temperature at the time of shooting. Thus, the feature information of the object in the thermal image is different depending on the ambient temperature of the object at the time of shooting. For example, in the case of a person's face, the nose and cheek darken with lower outside air temperatures and the entire face brightens with higher temperatures. In the case of detecting an object from a thermal image, feature information needs to be extracted taking into account the outside air temperature and the environment temperature at the time of shooting.

The correction unit 108 converts the analog electrical signal of the thermal image captured by the image capturing unit 107 into a digital signal and generates thermal image data with variation in the offset and the gain corrected for each light-receiving element of the image capturing unit 107. Also, after the variation in the offset and the gain are removed for each light-receiving element of the image capturing unit 107, the correction unit 108 perform non-uniformity correction (NUC) for each light-receiving element forming the pixels. NUC requires calibration by a temperature sensor (not illustrated). Thus, a shutter plate (not illustrated) or the like for covering the FPA with a surface of uniform temperature may be separately provided and a thermal image for correction may be acquired. The content and the order of the processing by the correction unit 108 is not limited by the present embodiment.

A timer 109 measures the time for the control management unit 104 to periodically acquire the temperature information from the temperature measurement unit 103. The control unit 100 sets the time for the timer 109. The control unit 100 generates a temperature acquisition event for the control management unit 104 according to the set time of the timer 109, and the control management unit 104 acquires the temperature information from the temperature measurement unit 103 each temperature acquisition event. Also, an acquisition event of a thermal image for temperature calibration for an FPA may be generated according to the time of the timer 109.

A communication unit 110 includes an interface for communicating with an external server or other external apparatuses via a network. The communication method may be a wired method such as Ethernet or a wireless method such as wireless LAN, 4G/LTE, 5G, and the like, but the present embodiment is not limited thereto. For example, the image capture apparatus 10 connects to the external server via a network using the communication unit 110 and transmits the frames of the thermal image captured by the image capturing unit 107 and the object detection result obtained by the inference processing unit 105 to the external server or another external apparatus. The external server is a cloud server, for example, that transmits at least one of the learned model and the learned parameter not possessed by the image capture apparatus 10 to the image capture apparatus 10. Also, for example, the image capture apparatus 10 and an operation apparatus (not illustrated) may be connected via the communication unit 110, and a user operation for remotely operating the image capture apparatus 10 may be transmitted from the operation apparatus to the image capture apparatus 10.

Also, in a case where thermal image data is transmitted to the external server or the like, since the thermal image has intensity information, the image capture apparatus 10 may be provided with a codec (not illustrated), and the thermal image may be compressed and encoded before being transmitted externally. The data transmitted from the image capture apparatus 10 which is an edge device is not limited by the present embodiment.

Figure 2:
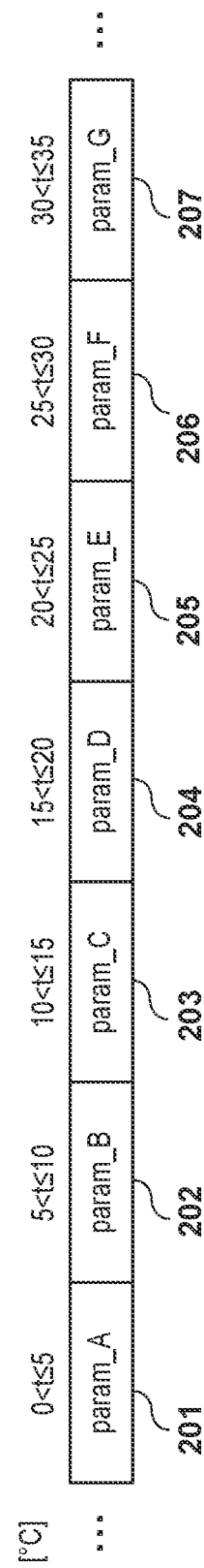
FIG. 2 is a diagram illustrating an example of a learned parameter for each temperature range according to the first embodiment.

FIG. 2 illustrates an example of the relationship between a learned parameter to be applied to a learned model according to the present embodiment and a temperature range for changing the learned parameter.

Trained parameters 201 to 207 are parameters divided into a plurality (for example, seven) of sections that each correspond to 5° C. of a temperature range from 0° C. to 35° C., with the parameters to be applied per section. For example, the learned parameter 201 (param_A) is the parameter selected for a temperature range from greater than 0° ° C. to 5° C. In the example illustrated in FIG. 2, the learned parameters have a range of temperature t from greater than 0° ° C. to 35° C. However, in practice, learned parameters exist with a temperature range from 0° C. or less to higher than 35° C.

The image capture apparatus 10 acquires temperature information t at a predetermined cycle (repetition time interval) from the temperature measurement unit 103, sets the learned parameter on the basis of the temperature information t using the control unit 100, and executes AI processing using the inference processing unit 105. As illustrated in FIG. 2, the control management unit 104 includes the threshold table 1041 including a predetermined number of learned parameters and the temperature range applied for each learned parameter associated together.

FIGS. 3A to 3C illustrate examples of the threshold table 1041 included in the control management unit 104 according to the present embodiment.

FIG. 3A illustrates an example of the learned parameters registered in the threshold table 1041 according to the present embodiment and the temperature ranges that the learned parameters are applied to. In FIG. 3A, in column 301, the name allocated to each learned parameter is registered as a label. Column 302 describes the temperature range applied to each learned parameter of the column 301.

In the present embodiment, from among the learned parameters illustrated in FIG. 3A, a portion are stored in the working memory 102 and the rest are downloaded from the external server via the communication unit 110. Thus, in column 303, information indicating whether or not each learned parameter of the label 301 is stored in the working memory 102 is registered. In column 304, address information indicating the storage location is registered in a case where the storage destination of the learned parameter is the working memory 102. Note that the storage location may be offset information for discretionary position information. Also, in a case where the storage destination of the learned parameter is not the working memory 102, information indicating "not exist" or "invalid" is described.

FIG. 3B illustrates an example of the configuration of a threshold table including learned parameters stored in the working memory 102 of the threshold table 1041 in FIG. 3A. In FIG. 3B, column 305 is the name of the learned parameters, from the threshold table 1041 in FIG. 3A, with the working memory 102 as the storage destination. Column 306 is similar to the column 302 of the threshold table 1041 in FIG. 3A and is the temperature range applied to each learned parameter of column 305. Column 307 is similar to the column 304 of the threshold table 1041 in FIG. 3A and is the address information of the working memory 102 which is the storage location of the learned parameter. The table in FIG. 3B is updated each time the learned parameters are downloaded and is configured of only the latest learned parameters with the working memory 102 as the storage destination.

FIGS. 3A and 3B illustrate a temperature range that the learned parameters are applied to from greater than 5° C. to 30° C., and the learned parameters of either table may be used.

Next the control processing of the image capture apparatus 10 according to the present embodiment will be described with reference to FIG. 4.

Figure 4:
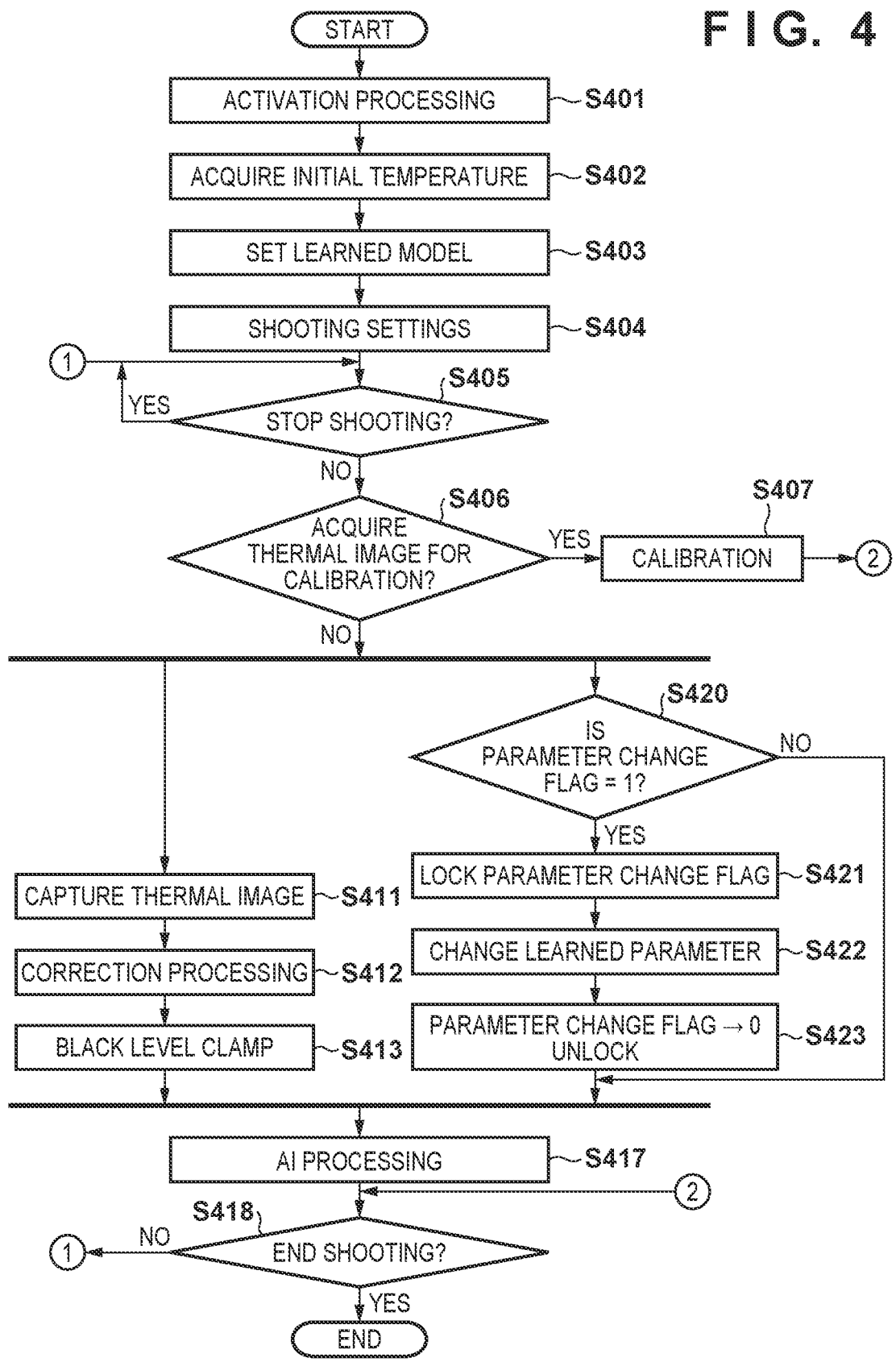
FIG. 4 is a flowchart illustrating control processing according to the first embodiment.

FIG. 4 is a flowchart illustrating the control processing of the image capture apparatus 10 according to the present embodiment.

The processing of FIG. 4 is implemented by a program stored in the non-volatile memory 101 being executed by the control unit 100 and the components being controlled when the power of the image capture apparatus 10 is turned on. The same applies for FIGS. 5, 7, 9, and 11 described below.

In step S401, the control unit 100 executes system activation processing, and advances the processing to step S402. Activation processing is executed by a program stored in the non-volatile memory 101 being read out, and the configuration of the working memory 102 and a memory controller (not illustrated) being performed. With the activation program, system clock control, peripheral (interface) and interrupt, and activation and initialization of the timer 109 are performed.

The timer 109 generates a temperature acquisition event for the control management unit 104 to acquire the temperature information. The temperature acquisition event may use the preset initial value.

In step S402, the control management unit 104 acquires the initial value of the temperature information from the temperature measurement unit 103, and advances the processing to step S403. The initial value of the temperature information may be acquired without a temperature acquisition event of the timer 109.

In step S403, the inference processing unit 105 performs initialization of the learned model 1051, and advances the processing to step S404. The inference processing unit 105 may download the AI processing program from the external server via the communication unit 110. Also, the inference processing unit 105 downloads the learned parameter 1052 corresponding to the preset and predetermined temperature range from the external server via the communication unit 110 and stores the learned parameter 1052 in the working memory 102. In this case, the temperature acquired in step S402 may be set in the center of the preset temperature range. Also, the inference processing unit 105 selects the learned parameter corresponding to the temperature range including the temperature information acquired in step S402 and sets this as the learned parameter 1052. The control management unit 104 updates the threshold table 1041 to reflect the learned parameter stored in the working memory 102 in step S403.

In step S404, the control unit 100 sets the settings relating to thermal image shooting for the image capturing unit 107 and the correction unit 108, and advances the processing to step S405. The settings content includes settings for the energizing time (exposure time) and the non-energizing time for the image capturing unit 107 according to the thermal time constant of the microbolometer, synchronizing signal generation, settings for the parameters relating to the correction processing of the correction unit 108, and the like. Also included are acquisition of the thermal image for calibration of the FPA, acquisition of a parameter for NUC, and the like. Note that though the FPA calibration is not described in detail, this is not limited to a specific processing, and various types of processing can be used. Also, measurement similar to that for visible light may be performed. Note that though the control of the optical unit 106 is not described in detail, this is not limited to a specific processing, and various types of processing can be used.

In step S405, the control unit 100 determines whether or not to stop thermal image shooting by the image capturing unit 107 and the correction unit 108. In a case where the control unit 100 determines to stop thermal image shooting, the operation of the image capturing unit 107 is stopped, and the determination processing of step S405 is repeated. In a case where the control unit 100 determines not to stop thermal image shooting, advances the processing to step S406. The requirement for stopping shooting is, for example, network disconnection, abnormal heat generation in the image capture apparatus 10, or the like, but other requirements may be used.

In step S406, the control unit 100 determines whether or not to acquire a thermal image for FPA temperature calibration. In a case where the control unit 100 determines to acquire a thermal image for FPA temperature calibration, advances the processing to step S407. In a case where the control unit 100 determines not to acquire a thermal image for FPA temperature calibration, advances the processing to steps S411 and S420.

In step S407, the correction unit 108 acquires a thermal image for FPA temperature calibration, performs calibration of the parameter for NUC, and advances the processing to step S418. Determining whether or not to execute temperature calibration of the bolometer may be determined by executing temperature calibration when a change in the temperature information acquired from the temperature measurement unit 103 in response to a temperature acquisition event of the timer 109 is equal to or greater than a threshold. In this case, the shutter plate (not illustrated) covering the FPA may be closed and a thermal image of a uniform temperature surface may be captured. In step S407, a correction parameter is calculated to make the FPA output uniform.

The processing between the thick lines (steps S411 to S413 and steps S420 to S423) are executed in parallel. When the parallel processing is complete, the processing of step S417 is started.

In step S411, the image capturing unit 107 converts the captured thermal image to a digital signal and outputs it to the correction unit 108, and advances the processing to step S412. A timing generator (not illustrated) may be provided, and the shooting timing may be synchronized with the timing of the generated periodic synchronizing signals.

In step S412, the correction unit 108 corrects variation in the offset component and the gain component caused by AD conversion by an analog circuit of the thermal image data output from the image capturing unit 107 or the like and performs NUC. Then, advances the processing to step S413. Note that in step S411, without waiting for shooting of a thermal image to be complete, the correction processing of step S412 may be started from a portion of the captured thermal image data, partially overlapping the processing of steps S411 and S412.

In step S413, the correction unit 108 executes black level clamp for reproducing the black level of the post-correction thermal image. This is offset clamp processing for the target black level may be simultaneously executed with the variation correction by the correction unit 108. The processing of step S413 may also be executed without waiting for the completion of the processing of step S412 to cascade the processing of steps S411, S412, and S413.

The processing from step S420 to S423 is executed by the control management unit 104 and the inference processing unit 105 and is processing to change the learned parameter to be applied to the AI processing in the image capture apparatus 10.

In step S420, the control management unit 104 determines whether a learned parameter change request has been generated on the basis of the value of the parameter change flag 1042. In a case where the control management unit 104 determines that a learned parameter change request has been generated, advances the processing to step S421. In a case where the control management unit 104 determines that a learned parameter change request has not been generated, advances the processing to step S417. The parameter change flag 1042 at value 1 (set) is a state where the learned parameter needs to be changed, and the parameter change flag 1042 at value 0 (reset), is a state where the learned parameter does not need to be changed (or the state of needing to change the learned parameter has been released).

In step S421, the control management unit 104 locks the value of the parameter change flag 1042 determined in step S420 so the value does not change. The change flag 1042 is set and referenced in the processing of FIG. 4 and the processing described below using FIG. 5 and thus may be implemented as a mutex (or a semaphore). Note that the flag setting is not limited by the present embodiment.

In step S422, the inference processing unit 105 changes the learned parameter 1052, and advances the processing to step S423. The control unit 100 performs DMA control on the learned parameter stored in the working memory 102 in step S403 via the control management unit 104 to transfer it to the storage area of the inference processing unit 105.

In step S423, the control management unit 104 sets the parameter change flag 1042 to value 0 to represent that the learned parameter has been changed. Then, the control management unit 104 releases the lock from step S421 allowing subsequent learned parameters to be changed, and advances the processing to step S417.

In step S417, the inference processing unit 105 executes AI processing using the inference processing unit 105 by applying the thermal image acquired in step S402 and the learned parameter 1052 changed as necessary in steps S420 to S423 to the learned model 1051, and advances the processing to step S418. As in the present embodiment, in a case where the image capture apparatus 10 detects a person from the thermal image, the AI processing result may be transmitted to the control unit 100 as coordinates in the thermal image and reliability information and may be temporarily stored in the working memory 102 together with the thermal image as a recognition map constituted by the accuracy levels of each image region. Also, the thermal image and/or the AI processing result may be transmitted to the external server or another external apparatus via the communication unit 110.

In step S418, the control unit 100 determines whether or not an end shooting request has been generated. In a case where the control unit 100 determines that an end shooting request has been generated, the processing of FIG. 4 ends. In a case where the control unit 100 determines that an end shooting request has not been generated, the processing returns to step S405, and the processing from step S405 is repeated. The end shooting request, for example, may be generated when the user uses a remote operation to instruct the image capture apparatus 10 to power off, and the control unit 100 receives the power off instruction via the communication unit 110.

Note that in FIG. 4, though the shutdown processing after the image capture apparatus 10 is powered off is omitted from the description, this processing is appropriately executed in accordance with a command of the control unit 100 when there is an order to stop power supply, status data to be backed up, or the like.

Next, the change determination processing for the learned parameter 1052 according to the present embodiment will be described with reference to FIG. 5.

Figure 5:
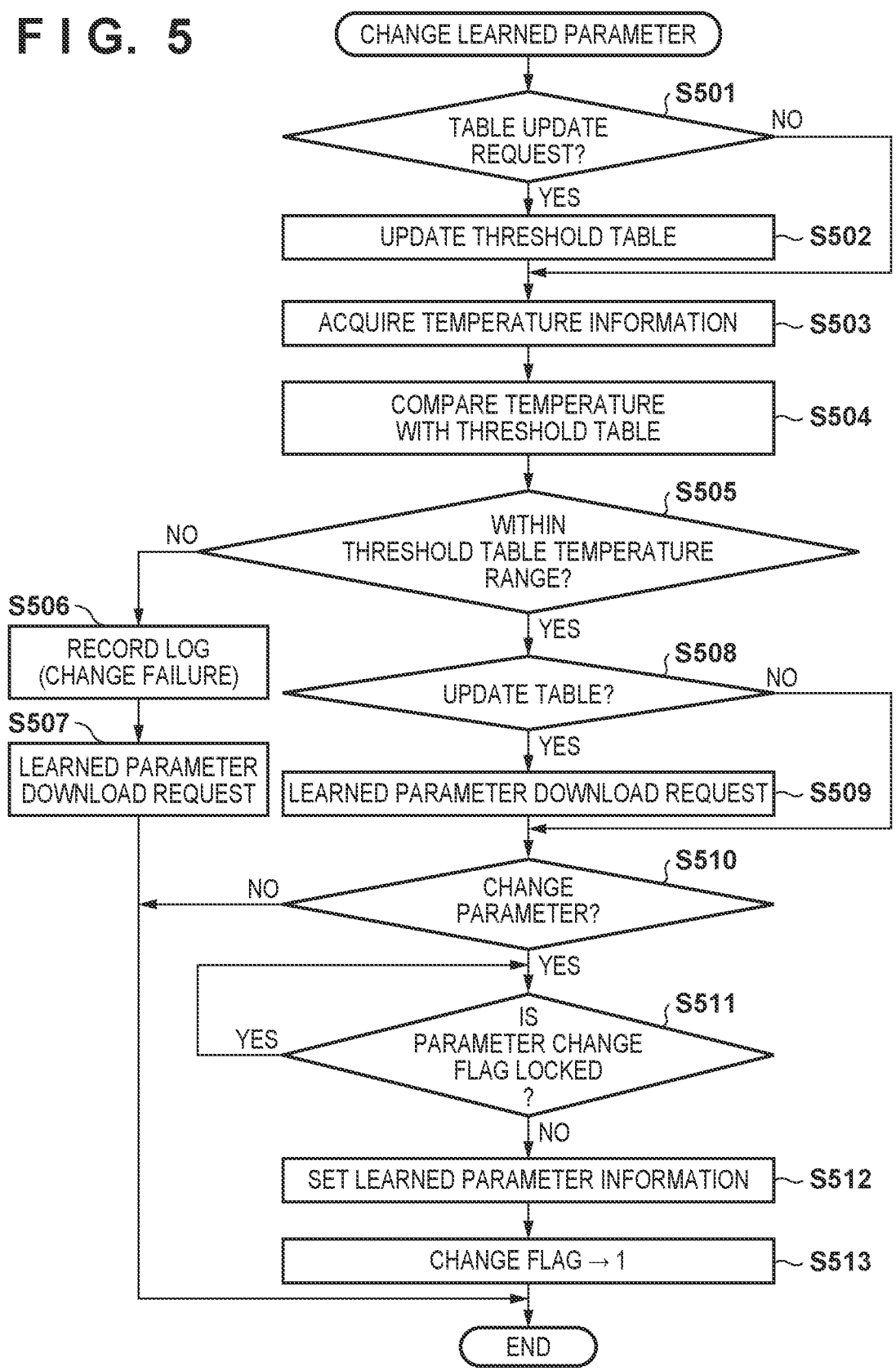
FIG. 5 is a flowchart illustrating learned parameter switching determination processing according to the first embodiment.

FIG. 5 is a flowchart illustrating the change determination processing for the learned parameter 1052 according to the present embodiment. The processing of FIG. 5 is started when a temperature acquisition event of the timer 109 is received.

In step S501, the control management unit 104 determines whether or not an update request for the threshold table 1041 has been generated on the basis of the value of the table change flag 1043. When the control management unit 104 determines that a table update request has been generated, advances the processing to step S502. When the control management unit 104 determines that a table update request has not been generated, advances the processing to step S503. A table update request is, when the table change flag 1043 is at value 1, a state where the threshold table 1041 needs to be updated, and when the table change flag 1043 is at value 0, a state where the threshold table 1041 does not need to be updated (or the state of needing an update has been released).

In step S502, the control management unit 104 changes the threshold table 1041. The threshold table 1041 is changed from the state illustrated in FIG. 3B to the state illustrated in FIG. 3C, for example. In the example in FIG. 3C, the upper limit of the temperature range is updated from 30° ° C. to 35° C., and the storage location (for example, offset address addr_0) of the working memory 102 where the deleted learned parameter (name param_11) had been stored is overwritten with the storage location of the newly added learned parameter.

In step S503, the control management unit 104 acquires the temperature information t from the temperature measurement unit 103, and advances the processing to step S504.

In step S504, the control management unit 104 compares the temperature information t acquired from the temperature measurement unit 103 in step S503 and the temperature range (temperature range 306 in FIG. 3C) of the threshold table 1041, and advances the processing to step S505.

In step S505, the control management unit 104 determines whether or not the temperature information t acquired in step S402 is included in the temperature range (the range from 10° C. to 35° C. of the temperature range 306 in FIG. 3C) between the upper limit and the lower limit of the threshold table 1041. In a case where the control management unit 104 determines that the temperature information t acquired in step S402 is not included in the temperature range from the upper limit to the lower limit of the threshold table 1041, advances the processing to step S506. In a case where the control management unit 104 determines that the temperature information t acquired in step S402 is included in the temperature range from the upper limit to the lower limit of the threshold table 1041, advances the processing to step S508.

In step S506, the control management unit 104 stores the change learned parameter failure in a log. This is processing to notify the user of abnormal operation in the edge device. A change failure event may be determined to have been generated when a learned parameter change is not made on time due to a sudden temperature change caused by air conditioning or the like with the image capture apparatus 10 being used indoors or when the learned parameter is not downloaded in time due to poor communication.

In step S507, the control management unit 104 transmits a download request for a new learned parameter to the external server via the communication unit 110, and the processing ends. In a case where a download request for a learned parameter of the same temperature range has already been transmitted (download is not on time), a download request may not be transmitted from the communication unit 110. The processing at the time of learned parameter change failure is not limited by the present embodiment.

In step S508, the control management unit 104 determines whether or not the threshold table 1041 needs to be updated on the basis of the temperature information t acquired in step S503. In a case where the control management unit 104 determines that the threshold table 1041 needs to be updated on the basis of the temperature information t acquired in step S503, advances the processing to step S509. In a case where the control management unit 104 determines that the threshold table 1041 does not need to be updated on the basis of the temperature information t acquired in step S503, advances the processing to step S510. The update determination method for the threshold table 1041 is described below using FIGS. 6A and 6B.

As in step S507, in the step S509, the control management unit 104 transmits a download request for a new learned parameter to the external server via the communication unit 110. Downloading a new learned parameter (processing to switch learned parameters) is described below using FIG. 7 and is executed in the background of the processing of FIG. 5.

In step S510, the control management unit 104 determines whether or not the learned parameter to be applied to the AI processing of the inference processing unit 105 needs to be changed for the temperature information t acquired in step S503. In a case where the control management unit 104 determines that the learned parameter needs to be changed, advances the processing to step S511. In a case where the control management unit 104 determines that the learned parameter does not need to be changed, the processing of FIG. 5 ends. The change determination method for the learned parameter 1052 is described below using FIGS. 6A and 6B.

In step S511, the control management unit 104 determines whether or not the parameter change flag 1042 is in a locked state. In a case where the control management unit 104 determines that the parameter change flag 1042 is in a locked state, this means that execution of the change processing for the learned parameter 1052 is in progress, and thus to avoid impacting the control request, the processing is put on standby until the locked state is released. In a case where the control management unit 104 determines that the locked state of the parameter change flag 1042 has been released, advances the processing to step S512.

In step S512, the control management unit 104 transmits information for accessing the new learned parameter to the inference processing unit 105. The control management unit 104, for example, sets the settings for the address of the storage location of the new learned parameter of the working memory 102 corresponding to the source in DMA transfer and the storage location (start address of the storage location in the case of SRAM) of the learned parameter 1052 of the inference processing unit 105 corresponding to the destination. The master and data transfer method for DMA transfer is not limited by the present embodiment. The learned parameter change processing is executed in step S422 of FIG. 4.

In step S513, the control management unit 104 sets the parameter change flag 1042 to value 1 and sets the state to a learned parameter change request has been generated state in step S420 in FIG. 4.

Next, the update determination method for the threshold table 1041 of step S508 in FIG. 5 and the change determination method for the learned parameter of step S510 will be described with reference to FIGS. 6A and 6B.

FIG. 6A illustrates the data configuration of a threshold table with a temperature range between the lower limit and the upper limit from 5° C. to 30° C. in which the learned parameter can be changed. FIG. 6B illustrates the data configuration of a threshold table with a temperature range between the lower limit and the upper limit from 10° C. to 35° C. in which the learned parameter can be changed. The temperature information t in FIGS. 6A and 6B is the temperature information acquired from the temperature measurement unit 103 and is the outside air temperature or the environment temperature surrounding in the image capture apparatus 10.

The learned parameter change determination of step S510 is defined as a first determination, and the threshold table update determination of step S508 is defined as a second determination. The temperature range to which the learned parameter is applied to is a first threshold in which a learned parameter change request is generated via the first determination. The sign tr is a predetermined temperature range from an upper limit to a lower limit side or a predetermined temperature range from a lower limit to an upper limit side of a temperature range in which a threshold table update request is generated via the second determination, this also corresponding to a second threshold. FIG. 6B illustrates an example of a state in which the temperature range of the threshold table 1041 has been changed from the state in FIG. 6A by a download request for a learned parameter of a temperature range greater than the upper limit of the temperature range via the second determination.

The first determination relating to the state in FIG. 6A will now be described. In a case where, within the temperature range of the second threshold of the threshold table of FIG. 6A, the temperature information t=19° C. is acquired, via the first determination of comparing the temperature information t and the temperature range of the first threshold, name param_13 is selected as the learned parameter to be applied to the AI processing. Thereafter, in a case where the temperature information t=21° ° C. is acquired, name param_14 is selected via the first determination. In this case, since there is a difference in the learned parameter selected via the first determination, a change request for the learned parameter 1052 in generated in the first determination and the parameter change flag 1042 is set to value 1.

Figure 7:
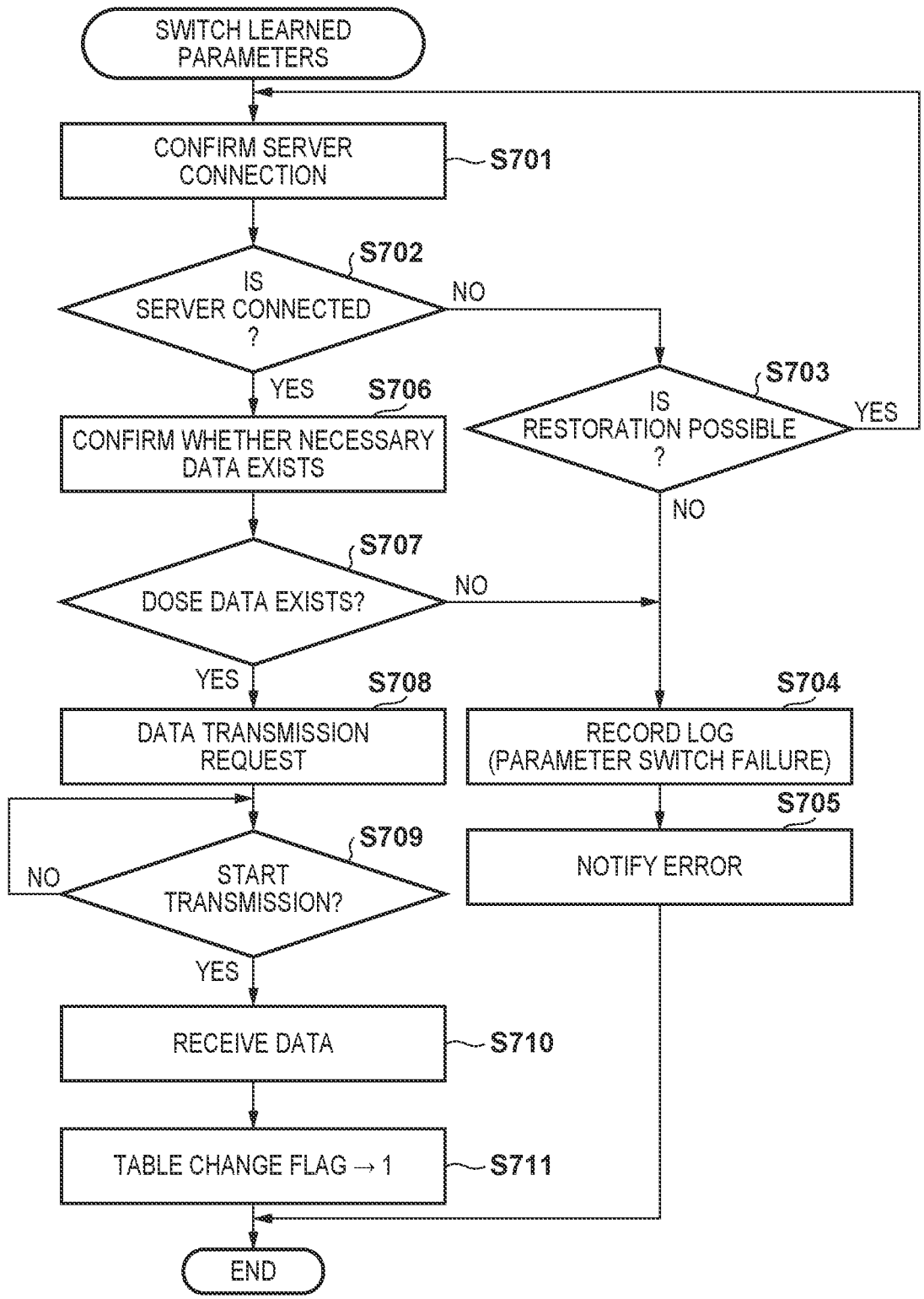
FIG. 7 is a flowchart illustrating switching processing for a learned parameter according to the first embodiment.

The second determination relating to the state in FIG. 6A will now be described. At the point in time when, in response to a temperature acquisition event of the timer 109, the temperature information t=19° C. is acquired, since the temperature information t is not within the temperature range of the second threshold, a threshold table update request is not generated via the second determination. Thereafter, in a case where the temperature information t=21° ° C. is acquired, since the temperature information t is within the temperature range of the second threshold, a request to update the threshold table (switch the learned parameter stored in the working memory 102) is generated via the second determination. The threshold table update request may be a request to interrupt the control unit 100. When the threshold table update request is received, the control management unit 104 executes the processing to switch the learned parameter described below using FIG. 7. In the processing of FIG. 7, the control unit 100 sends a request to the external server via the communication unit 110 to acquire a learned parameter (name param_16). FIG. 6B illustrates an example of a state in which the learned parameter of name param_16 is downloaded from the outside, and the temperature range from the lower limit to the upper limit in which the learned parameter of the threshold table 1041 can be changed is updated to from 10° ° C. to 35° C. (from param_12 to param_16). The data downloaded from the outside in this case includes the second threshold tr in addition to the learned parameter (name param_16) and the threshold tr is also updated with the threshold table 1041. In the example in FIG. 6B, the second threshold tr is updated from 10° C. to 7° C.

In the threshold table illustrated in FIG. 3B, in addition to a learned parameter 305, the temperature range 306 is also rewritten. After the learned parameter (title param_16) is switched, the threshold table illustrated in FIG. 3C is obtained. Among the payload when the learned parameter (name param_16) is downloaded, the temperature range (first threshold) corresponding to the learned parameter being downloaded may also be included and used to update the threshold table 1041 (from FIG. 3B to FIG. 3C).

The area where the learned parameter (name param_11) to be deleted from the working memory 102 is stored is overwritten with the learned parameter (name param_16), and the storage location 304 or 307 of the threshold table is updated with the start address (address addr_0) of the deleted learned parameter (name param_11).

Note that the second threshold tr, as illustrated in FIG. 6B, may be different in terms of the temperature range of the upper limit and the lower limit of the temperature range in which the learned parameter of the threshold table 1041 can be changed. In the example in FIG. 6B, the second threshold of the upper limit of the temperature range is indicated by the symbol trH, and the second threshold of the lower limit is indicated by the symbol trL. Also, for example, a register (not illustrated) for temporarily storing the second threshold of the upper limit and the lower limit of the temperature range may be provided in the control management unit 104.

The first determination relating to the state in FIG. 6B will now be described. In a case where the temperature information t=26° C. is acquired, via the first temperature determination, name param_15 is selected as the learned parameter to be applied to the AI processing. Thereafter, also in a case where the temperature information t=29° ° C. is acquired, name param_15 is selected as the learned parameter, and thus the parameter change flag 1042 is set to value 0 without a learned parameter change request being generated in the first determination.

The second determination relating to the state in FIG. 6B will now be described. At the point in time when, in response to a temperature acquisition event of the timer 109, the temperature information t=26° C. is acquired, since the temperature information t is not within the temperature range of the second threshold, a threshold table update request is not generated via the second determination. Thereafter, in a case where the temperature information t=29° C. is acquired, since the temperature information t is within the temperature range of the second threshold, a request to update the threshold table (switch the learned parameter stored in the working memory 102) is generated via the second determination. The control management unit 104 sends a threshold table update request to the control unit 100. When the threshold table update request is received, the control unit 100 executes learned parameter switching processing described below using FIG. 7 and downloads the learned parameter from the outside. The area where the learned parameter (name param_12) to be deleted from the working memory 102 is stored is overwritten with the learned parameter downloaded from the outside, and the storage location 304 or 307 of the threshold table is updated with the start address (address addr_1) of the deleted learned parameter (name param_12).

In this manner, in the present embodiment, a change in the use environment (outside air temperature or environment temperature) of an edge device can be predicted, and a learned parameter can be acquired from the outside in advance to update a threshold table. Accordingly, in a case where there needs to be a change in the learned parameter to be used in the AI processing due to a change in the use environment (outside air temperature or environment temperature) of the edge device, stopping the AI processing to acquire a learned parameter from the outside can be avoided.

Note that the second determination in the state illustrated in FIGS. 6A and 6B may be performed on the basis of a temperature change instead of the second threshold. For example, a temperature measurement member with a large change in properties before and after the Curie point (Curie temperature) may be provided, and the second determination may be performed on the basis of a comparison between the change in properties and a third threshold (not illustrated). In this case, the Curie point is set near the target temperature, and at the point in time when the change in properties of the temperature measurement member becomes greater than the third threshold, a threshold table update request is generated. This method is effective in urgently expanding the temperature range of the upper limit or the lower limit of the threshold table in the direction of temperature change when the temperature change is large. The temperature measurement member with a large temperature change before and after the Curie point is a positive temperature coefficient (PTC) thermistor, for example. A temperature change near the target temperature may be directly detected using the PTC thermistor with an appropriate value for the Curie point.

A member other than a PTC thermistor may be used. For example, in a case where the outside air temperature comes close to 40° C. such as the recent weather in Japan, in many cases the temperature near the ground easily exceeds 40° ° C. due to the reflection of the asphalt and the like. Using a member that changes magnetic properties at approximately 40° C. (loses magnetic properties when the temperature is greater than 40° C.) such as an amorphous magnetic member made of Mn—Cu ferrite or the like, the second determination may be executed taking a comparison between a change in impedance and the third threshold as the temperature change. The second determination may be executed on the basis of either the comparison result of the temperature information and the second threshold or the comparison result of the change in impedance (temperature change) and the third threshold.

Also, as described below using FIG. 9, a temperature acquisition cycle (first cycle T) set by the timer 109 may be changed according to a change in the outside air temperature or the environment temperature. For example, the settings of the timer 109 are adjusted so that when the temperature change is a large increase or decrease, the temperature acquisition cycle is made shorter and when the temperature change is a small increase or decrease, the temperature acquisition cycle is made longer.

Next, the learned parameter switching processing according to the present embodiment will be described with reference to FIG. 7.

FIG. 7 is a flowchart illustrating the learned parameter switching processing according to the present embodiment. The processing of FIG. 7 is executed when updating the threshold table 1041 in FIG. 5 (when switching the learned parameter). In the example described below, the control management unit 104 sends a learned parameter transmission request to the external server via the communication unit 110 and downloads the learned parameter from the external server.

In step S701, the control management unit 104 performs connection confirmation with the server via the communication unit 110.

In step S702, the control management unit 104 determines whether or not the result of the connection confirmation with the server in step S701 is a normal connection with the external server. In a case where the control management unit 104 determines that there is a normal connection with the external server, advances the processing to step S706. In a case where the control management unit 104 determines that there is not a normal connection with the external server, advances the processing to step S703.

In step S703, the control management unit 104 determines whether or not there is a communication fault in the connection with the external server. In a case where the control management unit 104 determines that there is a communication fault in the connection with the external server and communications cannot be restore by waiting, the error processing of steps S704 and S705 are executed, and the processing of FIG. 7 ends. In a case where the control management unit 104 determines that there is not a communication fault in the connection with the external server and communication cannot be restore by waiting, the processing returns to step S701 and connection confirmation with the external server is continued.

In step S704, the control management unit 104 records in a log that normal processing has been unable to be executed (a failure to switch the learned parameter). As the information recorded in the log, time of occurrence, communication fault or not, does necessary data exist, and cause of failure may be recorded, for example. The information recorded in the log is not limited by the present embodiment.

In step S705, the control management unit 104 notifies the user that an error has occurred, and the processing of FIG. 7 ends. In a case where the error is in the determination result of step S707 described below, an error message (OSD or the like) is superimposed over the thermal image (intensity image), and this is displayed on the operating terminal (not illustrated) of the user. In a case where communication with the external server cannot be performed due to a communication fault or the like, the notification may be performed by lighting up or flashing a lighting member (not illustrated), such as an LED, a red color. The light up/flash control may be executed by the control unit 100. The notification processing at the time of a communication fault is not limited by the present embodiment.

In step S706, the control management unit 104 queries the external server via the communication unit 110 as to the existence of the data required for download. In an example in which the temperature information t=21° ° C. of FIG. 6A is acquired, the existence of a learned parameter (param_16) is queried, and the external server responds with whether or not the learned parameter (param_16) exists. The method of querying the server is not limited by the present embodiment.

In step S707, the control management unit 104 determines, as the result of the query in step S706, whether or not the data required for download exists in the external server. In a case where the control management unit 104 determines that the data required for download exists in the external server, advances the processing to step S708. In a case where the control management unit 104 determines that the data required for download does not exist in the external server, the error processing of steps S704 and S705 is executed, and the processing of FIG. 7 ends. This processing corresponds to a case where, as described in FIGS. 6A and 6B, the temperature information t acquired in step S503 in FIG. 5 is within the temperature range of the second threshold of the threshold table 1041, and the threshold table 1041 is required to be updated in step S508, but the learned parameter required for download cannot be downloaded from the outside.

In step S708, the control management unit 104 sends a transmission request for the learned parameter required for download and the temperature range thereof (the second threshold described using FIGS. 6A and 6B) to the external server via the communication unit 110.

In step S709, the control management unit 104 waits until the transmission of the data requested in step S708 starts, and then after the transmission starts, advances the processing to step S710.

In step S710, the control management unit 104 receives the data requested for download from the external server. The learned parameter and the temperature range thereof received from the external server are stored in a predetermined address of the working memory 102. The predetermined address corresponds to storage location addr_0 in the example of name param_16 of the learned parameter in FIG. 6B. Note that the data received from the external server may be temporarily stored in the buffer memory (not illustrated) of the communication unit 110 and then transferred to the working memory 102. Also, the data may be transferred to the working memory 102 via DMA transfer. Note that the series of processing from receiving the data from the external server to storing the data in the working memory 102 is not limited by the present embodiment. Also, regarding step S710, examples such as when data is failed to be received from the external server is not described, but in such cases, various recovery processing may be executed.

In step S711, the control management unit 104 changes the table change flag 1043 to value 1, and an update request for the threshold table 1041 using the new learned parameter is generated.

Next, change processing of the temperature acquisition cycle of the timer 109 according to the present embodiment will be described with reference to FIG. 9.

Figure 9:
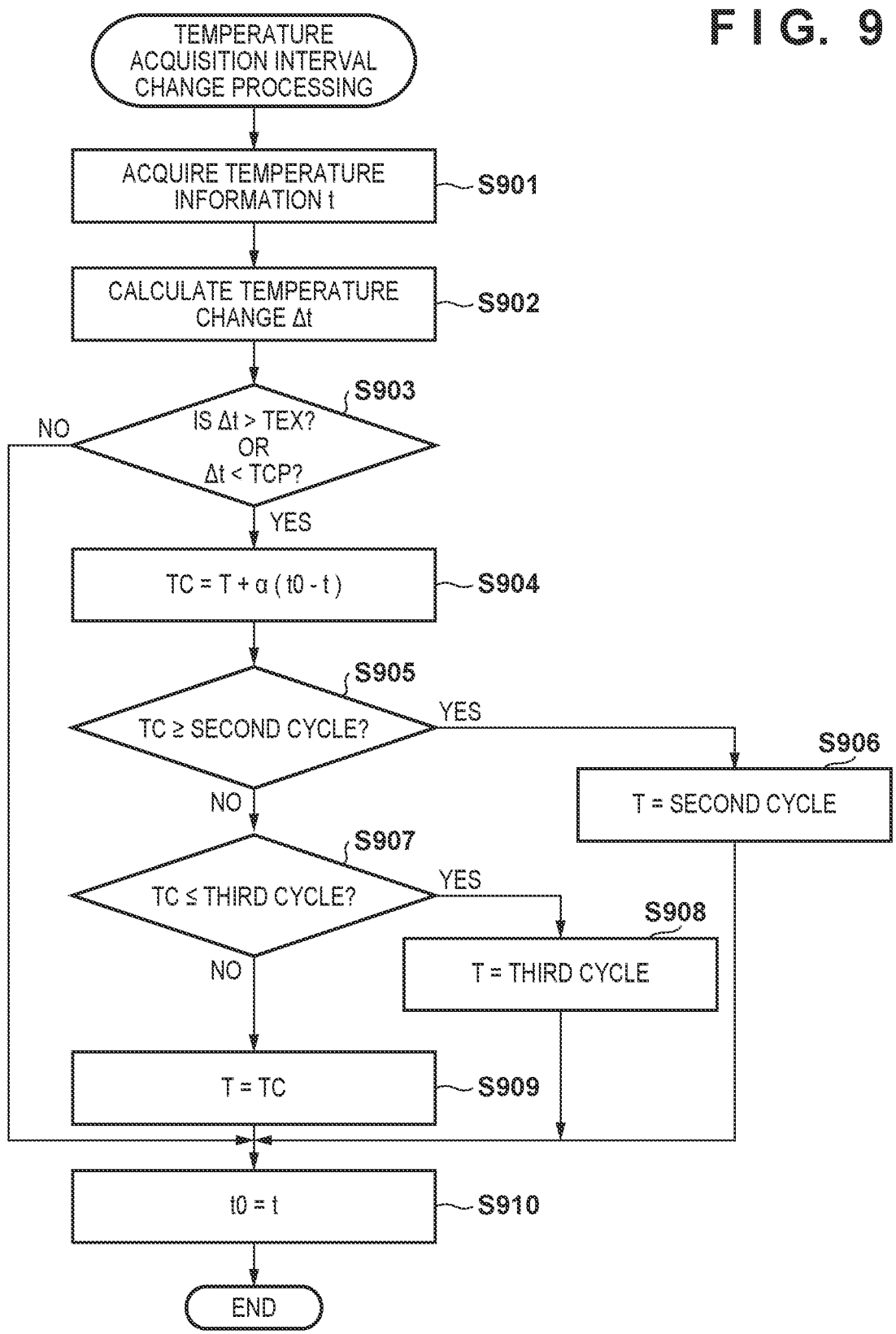
FIG. 9 is a flowchart illustrating change processing for a temperature acquisition cycle according to the first embodiment.

The processing of FIG. 9, processing to interrupt the control unit 100 may be activated each time a temperature acquisition event of the timer 109 is generated. The processing of FIG. 9 may be executed in parallel with the processing of FIG. 5.

In step S901, the control unit 100 acquires the temperature information t from the temperature measurement unit 103. Note that the control unit 100 stores a previous temperature information t acquired from the temperature measurement unit 103 at the previous temperature acquisition event in a register (not illustrated).

In step S902, the control unit 100 reads out the previous temperature information t0 from the register and calculates a temperature change $\Delta t$ ($\Delta t=|t-t0|$) of the current temperature t.

In step S903, the control unit 100 compares the temperature change $\Delta t$ and a fourth threshold TEX or a fifth threshold TCP. In a case where the control unit 100 determines that the temperature change $\Delta t$ is greater than the fourth threshold TEX or the temperature change $\Delta t$ is less than the fifth threshold TCP, advances the processing to step S904. In a case where the control unit 100 determines that the temperature change $\Delta t$ is equal to or less than the fourth threshold TEX or the temperature change $\Delta t$ is equal to or greater than the fifth threshold TCP, adjustment of the first threshold is not required, and thus advances the processing to step S910.

In step S904, in a case where the temperature change $\Delta t$ is greater than the fourth threshold TEX, the control unit 100 shortens the first cycle, and in a case where the temperature change $\Delta t$ is less than the fifth threshold TCP, the control unit 100 lengthens the first cycle.

The control unit 100 calculates a change candidate value TC for the first cycle from the following Formula 1.

$$TC=T+\alpha(t0-t) \quad \text{Formula 1}$$

The unit of the temperature difference t0−t is "° C.", the unit of the first cycle is T and the change candidate value is TC "min" (amount of time in minutes), and thus the unit for the coefficient α is "min/° C.". In the case of an increase in the temperature (Δt>TEX), the first cycle is 10 (min) and the adjustment amount a per 1° C. is 0.5 (adjustment of 30 sec per 1° C.), and if the fourth threshold TEX is 2(° C.) and an increase from 30(° C.) to 33(° C.), making t0−t=−3(° C.), then TC=10+0.5×(−3)=10−1.5=8.5. The change candidate value TC of the first cycle is 8 minutes and 30 seconds. The calculation formula described above is an example and is not limited by the present embodiment. The adjustment cycle may be set to increments of a fixed value width (so that for each adjustment request, a fixed value is added or subtracted).

In step S905, the control unit 100 determines whether or not the change candidate value TC of the first cycle is equal to or greater than a preset second cycle. In a case where the control unit 100 determines that the change candidate value TC of the first cycle is equal to or greater than the second cycle, advances the processing to step S906. In a case where the control unit 100 determines that the change candidate value TC of the first cycle is less than the second cycle, advances the processing to step S907.

In step S906, the control unit 100 changes the first cycle to the second cycle, and advances the processing to step S910. The second cycle defines (first cycle<second cycle) the maximum value of the temperature acquisition cycle (first cycle).

In step S907, the control unit 100 determines whether or not the change candidate value TC of the first cycle is equal to or less than a preset third cycle. In a case where the control unit 100 determines that the change candidate value TC of the first cycle is equal to or less than the third cycle, advances the processing to step S908. In a case where the control unit 100 determines that the change candidate value TC of the first cycle is greater than the third cycle, advances the processing to step S909.

In step S908, the control unit 100 changes the first cycle to the third cycle, and advances the processing to step S910. The third cycle defines (first cycle>third cycle) the minimum value of the temperature acquisition cycle (first cycle).

In step S909, the control unit 100 substitutes the change candidate value TC of the first cycle T for the first cycle T, and advances the processing to step S910.

In step S910, the control unit 100 substitutes the current temperature information t for the previous temperature information to, and the processing of FIG. 9 ends.

According to the first embodiment described above, since there is no need to store the learned parameters according to various use environments in the image capture apparatus 10 which is an edge device, the storage capacity and costs are not increased.

Also, by predicting a change in the use environment (temperature at the time of shooting) of the edge device and acquiring a learned parameter from the outside in advance to update the threshold table, stoppage of the AI processing caused by acquiring a learned parameter from the outside when the learned parameter to be used in the AI processing needs to be changed due to a change in the use environment (outside air temperature or environment temperature) of the edge device can be avoided.

Second Embodiment

In the second embodiment described below, the information collection apparatus according to the present invention is applied to a sound recording apparatus.

In the present embodiment, an example will be described in which a learned parameter is changed on the basis of humidity information at the time of sound recording by a sound recording apparatus. According to the second embodiment, changing to a learned parameter according to the use environment of the sound recording apparatus can be performed without stopping the AI processing in the sound recording apparatus which is an edge device.

Sound is the vibration of air, and a state with high air density containing more moisture than a state with low air density and low humidity has better conditions with more media for propagating sound. However, low-pitch sounds have relatively greater energy when viewed over the entire bandwidth of sound, and thus the change due to humidity is minimal. However, high-pitch sounds have short wavelengths and low energy. Thus, that energy is absorbed by the moisture in the air, making the sound attenuate during propagation. In regards to this, in the present embodiment, on the basis of a change in the attenuation amount of high-pitch sounds caused by a change in the humidity, the sound recording apparatus converts an analog sound signal of the operating sound of a mechanical device operating in a factory or the like collected by a sound collecting unit into a digital signal via an AD converter and generates sound recorded data. Then, AI processing is executed on the sound recorded data generated in a predetermined humidity acquisition cycle, and fault analysis processing for analyzing faults in a mechanical device from the operating sound is executed.

A sound recording apparatus 20 according to the present embodiment can be applied to a web camera or network camera, an onboard camera, a surveillance camera, a medical camera, a smart speaker, and the like with a sound recording function communicably connectable via a network as an edge device.

Figure 10:
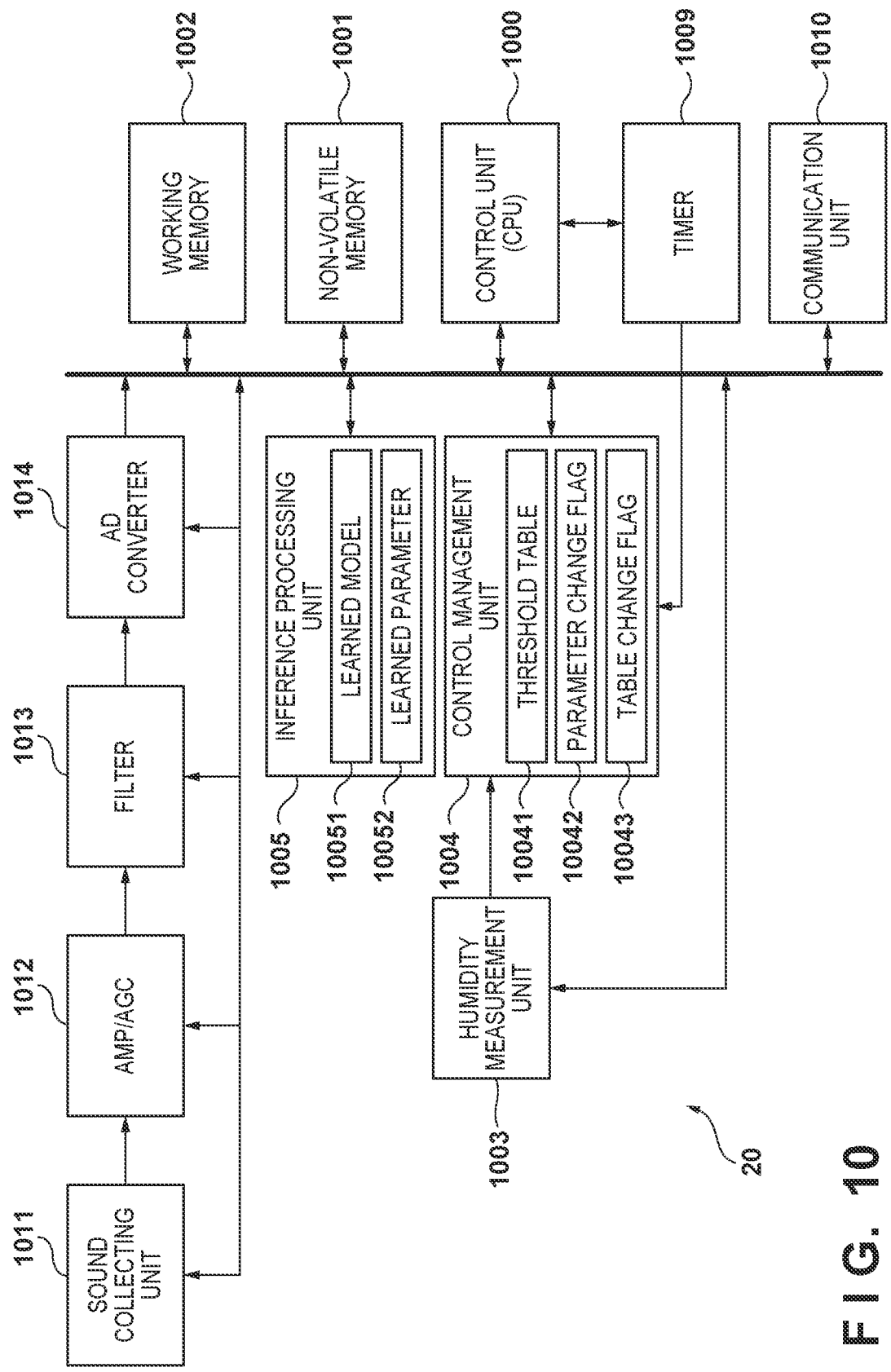
FIG. 10 is a block diagram illustrating an apparatus configuration according to a second embodiment.

The configuration and functions of the sound recording apparatus 20 according to the second embodiment will be described with reference to FIG. 10.

The sound recording apparatus 20 according to the present embodiment collects the operating sound of a mechanical device operating in a factory or the like via a sound collecting unit and records the sound.

A control unit 1000, a non-volatile memory 1001, a working memory 1002, a timer 1009, and a communication unit 1010 are similar to the control unit 100, the non-volatile memory 101, the working memory 102, the timer 109, and the communication unit 110 shown in FIG. 1 of the first embodiment except that humidity is substituted for temperature and sound is substituted for a thermal image.

A humidity measurement unit 1003 includes a humidity sensor and an AD converter (not illustrated). The humidity sensor has a structure including electrodes on either side of a moisture sensitive material, converts a change in the absorption/desorption of the moisture sensitive material into a change in resistance or a change in capacitance, and outputs an electrical signal. The AD converter generates humidity information obtained by converting the analog electrical signal (voltage value) generated by the humidity sensor into a digital signal.

A control management unit 1004 acquires the humidity information from the humidity measurement unit 1003 and manages the control data such as tables and flags for when executing the AI processing in an inference processing unit 1005 described below. In a similar manner to the control management unit 104 illustrated in FIG. 1 according to the first embodiment, the control management unit 1004 includes a threshold table 10041, a parameter change flag 10042, and a table change flag 10043 and changes and updates the parameters and humidity ranges, sets and resets the flags, and the like. The table 10041 and the flags 10042 and 10043 may not be managed by the control management unit 1004 and instead be stored in the working memory 1002 or the like that can be accessed by the control management unit 1004.

The inference processing unit 1005 includes a learned model 10051 and a learned parameter 10052. The inference processing unit 1005 executes fault analysis processing using AI processing by applying the sound recorded data generated by a sound collecting unit 1011 described below and the learned parameter 10052 selected by the control unit 1000 to the learned model and outputs a fault detection result. The detected fault may be a fault in a mechanical device operating in a factory or the like, for example. In this case, the inference processing unit 1005 may include a graphics processing unit (GPU) that can efficiently perform calculations by executing a large amount of parallel processing of microcodes and the like. In the case of using a learned model to execute inference processing a plurality of times such as with deep learning and machine learning, executing processing with a GPU is effective. In the present embodiment, for the inference processing, the control unit 1000 and the GPU may cooperate to perform calculations or only the control unit 1000 or the GPU may perform calculations.

The sound collecting unit 1011 is a microphone that converts sound into an electrical signal and outputs this. The frequency characteristics of the microphone include being able to collect sound up to a range (for example, from approximately 100 kHz to 400 KHz) greater than the audible frequency range (from 20 Hz to 20000 Hz) for fault analysis, and an industrial ultrasonic microphone (ultrasonic sensor) or the like may be used. Also, a microphone array configuration using a plurality of microphones may be used. The sound collecting unit 1011 according to the present embodiment is not limited to a microphone.

An AMP/AGC 1012 includes a preamp for amplifying the analog sound signal output from the sound collecting unit 1011 and an automatic gain control (AGC) for avoiding distortion due to saturation.

A filter 1013 is an anti-aliasing filter for avoiding aliasing when converting an analog sound signal into a digital signal at a predetermined cycle.

An AD converter 1014 samples the analog sound signal at a predetermined cycle, converts this to a digital signal, and generates sound recorded data. The analog sound signal is restricted to a bandwidth half that of the sampling frequency by the filter 1013.

The data transmitted to the external server or another external apparatus may be sound recorded data recorded in the sound recording apparatus 20 and the AI processing result (fault analysis result). The sound recorded data may be prepared separate to the data with the restricted bandwidth for monitoring by a human (bandwidth restriction filter is not illustrated). Also, the sound recording apparatus 20 may be provided with a codec (not illustrated), and compression and encoding may be performed on the sound recorded data before it is transmitted to the outside. Note that for the data transmitted from the sound recording apparatus 20 which is an edge device, the amount of information on the high frequency side may be deleted by quantization, for example.

Next, the control processing of the sound recording apparatus 20 according to the second embodiment will be described with reference to FIG. 11.

Figure 11:
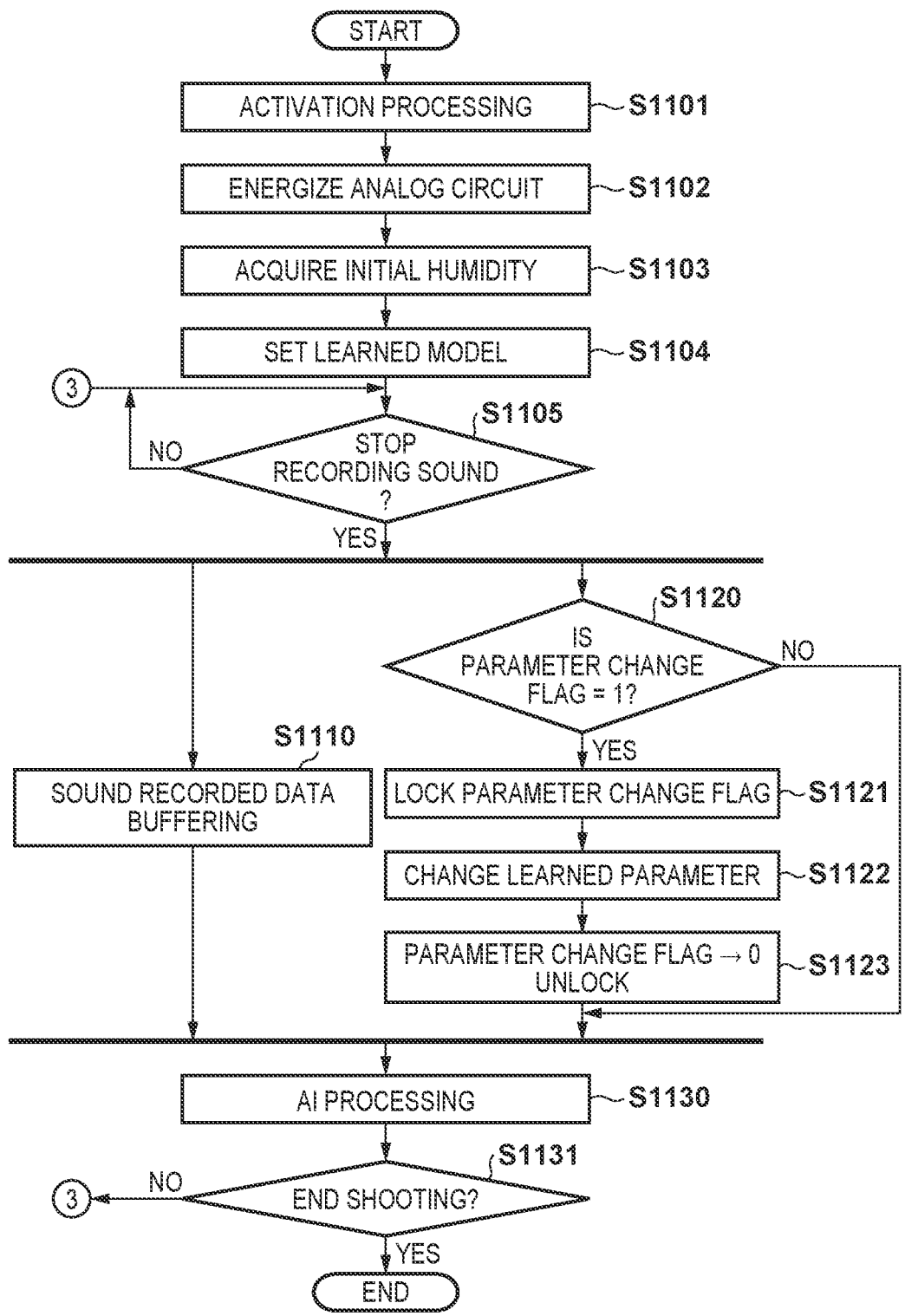
FIG. 11 is a flowchart illustrating control processing according to the second embodiment.

FIG. 11 is a flowchart illustrating the control processing of the sound recording apparatus 20 according to the second embodiment.

In step S1101, the control unit 1000 executes system activation processing, and advances the processing to step S1102. The activation processing is similar to that in step S401 in FIG. 4 according to the first embodiment.

The timer 1009 generates a humidity acquisition event for the control management unit 1004 to acquire the humidity information. The humidity acquisition event may be set to a preset initial value.

In step S1102, since the operation of the analog circuit is stabilized earlier, the control unit 1000 energizes the sound collecting unit 1011, the AMP/AGC 1012, the filter 1013, and the AD converter 1014 and waits.

In step S1103, the control management unit 1004 acquires the initial value of the humidity information from the humidity measurement unit 1003, and advances the processing to step S1104. The initial value of the humidity information may be acquired without a humidity acquisition event of the timer 109.

In step S1104, the inference processing unit 1005 performs initialization of the learned model, and advances the processing to step S1105. This processing is similar to that in step S403 in FIG. 4 according to the first embodiment except that humidity information is substituted for temperature information. In the present embodiment also, when a common learned model is used, only the learned parameter is changed according to the humidity information. Also, in this processing, the control management unit 1004 may initialize the threshold table 10041. The configuration of the threshold table is similar to that in FIGS. 3A and 3B. The temperature range 302 (306) in FIGS. 3A and 3B is changed to the humidity range, and the unit of the parameter changes from "° C." to "%". However, in a case where the humidity range to which the learned parameter is applied is from 0 (%) to 100 (%) in increments of 5%, from 20 types of learned parameters, five types of data are stored in the working memory 1002 as in the first embodiment.

In step S1105, the control unit 1000 determines whether or not to stop recording sound. In a case where the control unit 100 determines to stop recording sound, the sound data generation is stopped, and the determination processing of step S1105 is repeated. In a case where the control unit 1000 determines not to stop recording sound, advances the processing to step S1106. The requirement for stopping sound recording is, for example, network disconnection, abnormal heat generation in the sound recording apparatus 20, or the like, but the requirement is not limited by the present embodiment.

The processing between the thick lines (step S1110 and from steps S1120 to S1123) are executed in parallel. When the parallel processing is complete, the processing of step S1130 is started.

In step S1110, the sound recorded data of a predetermined cycle is temporarily stored (buffering) in a storage unit such as the working memory 1002 as the target for AI processing. The storage unit may include a plurality of storage areas for buffering sound recorded data, and AI processing of the sound recorded data in each storage area may be superimposed and executed so as to allocate a storage area different from the storage area of the learned model to be used in the AI processing. In a case where there is sound recorded data that can be subjected to AI processing other than the current sound recorded data, without waiting for the buffering of the current sound recorded data, the processing of step S1130 may be started after waiting for only the completion of the processing of the data started in parallel.

The processing from steps S1120 to S1123 is processing to change the learned parameter to be used in the AI processing of the sound recording apparatus 20, which is an edge device, and is similar to that from steps S420 to S423 in FIG. 4 according to the first embodiment.

In step S1130, the inference processing unit 1005 executes AI processing using the inference processing unit 1005 by applying the sound recorded data buffered in step S1110 and the learned parameter changed as necessary from steps S1120 to S1123 to the learned model 10051, and advances the processing to step S1131.

The fault analysis result output by the AI processing according to the present embodiment is, for example, an error code indicating an abnormal sound in the gear of a mechanical device, a change in the press sound, or the like and may be transmitted to the control unit 1000. The fault analysis result and the sound recorded data (this may be buffered data or sound recorded data separated sampled for monitoring) for monitoring by a human may be transmitted to the external server or another external apparatus via the communication unit 1010. In this case, the data for monitoring may be transmitted to the operating terminal (not illustrated) of a user. Also, only the fault analysis result of the time of fault diagnosis (when a fault is presumed to have occurred) may be transmitted. Note that the data transmitted from the sound recording apparatus 20 which is an edge device is not limited by the present embodiment.

In step S1131, the control unit 1000 determines whether or not an end sound recording request has been generated. In a case where the control unit 1000 determines that an end sound recording request has been generated, the processing of FIG. 11 ends. In a case where the control unit 1000 determines that an end sound recording request has not been generated, the processing returns to step S1105, and the processing from step S1105 is repeated. The end sound recording request, for example, may be generated when the user uses a remote operation to instruct the sound recording apparatus 20 to power off, and the control unit 1000 receives the power off instruction via the communication unit 1010.

Note that in FIG. 11, though the shutdown processing after the sound recording apparatus 20 is powered off is omitted from the description, this processing is appropriately executed in accordance with a command of the control unit 1000 when there is an order to stop power supply, status data to be backed up, or the like.

Note that the learned parameter change processing and the threshold table update processing are similar to the processing in FIG. 5 except the temperature information is substituted with the humidity information. Also, the learned parameter switching processing is similar to the processing in FIG. 7.

According to the second embodiment described above, since there is no need to store the learned parameters according to various use environments in the sound recording apparatus 20 which is an edge device, the storage capacity and costs are not increased.

Also, by predicting a change in the use environment (outside air temperature or environment temperature) of the edge device and acquiring a learned parameter from the outside in advance to update the threshold table, stoppage of the AI processing caused by acquiring a learned parameter from the outside when the learned parameter to be used in the AI processing needs to be changed due to a change in the use environment (humidity at the time of sound recording) of the edge device can be avoided.

Note that in the first and second embodiments described above, a learned parameter not possessed by an edge device is acquired from the outside. However, a learned parameter together with a learned model may be acquired from the outside or only the learned model may be acquired from the outside.

Also, the edge device described in the first and second embodiments described above may be a stationary apparatus or a moving apparatus such as a drone.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185750, filed Nov. 21, 2022 which is hereby incorporated by reference herein in its entirety.

What is claimed is:

1. An information collection apparatus that executes inference processing using a learned model, comprising:
    a communication unit that communicates with an external apparatus;
    a first acquisition unit that acquires first information relating to a use environment of the information collection apparatus;
    a second acquisition unit that acquires second information corresponding to a target for the inference processing;
    a processing unit that executes the inference processing by applying the second information and third information set on a basis of the first information to the learned model; and
    a control unit that sets the third information on a basis of a range of a first threshold of the first information, wherein, in a case where the first information is within a range of a second threshold, the control unit selects the third information on a basis of the range of the first threshold of the first information, and in a case where the first information is not within the range of the second threshold, the control unit acquires the third information from the external apparatus via the communication unit so that the first information is within the range of the second threshold.

2. The apparatus according to claim 1, further comprising a storage unit that stores the third information within the range of the second threshold, wherein, in a case where the first information is not within the range of the second threshold, the control unit acquires the third information and the range of the first threshold corresponding to the third information from the external apparatus via the communication unit so that the first information is within the range of the second threshold, and the third information and the range of the first threshold corresponding to the third information stored in the storage unit are substituted for the third information and the range of the first threshold corresponding to the third information acquired from the external apparatus.

3. The apparatus according to claim 2, wherein the control unit includes a threshold table where a plurality of pieces of the third information and the range of the first threshold to be applied to each piece of the third information are associated, and the threshold table includes, in addition to the range of the first threshold to be applied to each piece of the third information, at least one of information indicating whether or not the third information is stored in the storage unit and information indicating a storage location of the storage unit.

4. The apparatus according to claim 2, wherein in a case where the first information is not within a predetermined range from an upper limit to a lower limit side of the range of the second threshold, the control unit acquires third information greater than the upper limit and a range of a first threshold to be applied to the third information from the external apparatus, and in a case where the first information is not within a predetermined range from a lower limit to an upper limit side of the range of the second threshold, the control unit acquires third information less than the upper limit and a range of a first threshold to be applied to the third information from the external apparatus.

5. The apparatus according to claim 2, wherein in a case where a change amount of the first information is greater than a threshold of an upper limit of the first information, the control unit acquires third information greater than the upper limit and a range of a first threshold to be applied to the third information from the external apparatus, and in a case where a change amount of the first information is less than a threshold of a lower limit of the first information, the control unit acquires third information less than the lower limit and a range of a first threshold to be applied to the third information from the external apparatus.

6. The apparatus according to claim 4, wherein the control unit stores the third information greater than the upper limit and the range of the first threshold to be applied to the third information acquired from the external apparatus in the storage unit and deletes the third information of the lower limit and the range of the first threshold to be applied to the third information stored in the storage unit, and stores the third information less than the lower limit and the range of the first threshold to be applied to the third information acquired from the external apparatus in the storage unit and deletes the third information of the lower limit and the range of the first threshold to be applied to the third information stored in the storage unit.

7. The apparatus according to claim 1, wherein the first acquisition unit acquires the first information at a first cycle, in a case where a change amount of the first information is greater than a predetermined threshold, the control unit shortens the first cycle, and in a case where a change amount of the first information is less than a predetermined threshold, the control unit lengthens the first cycle.

8. The apparatus according to claim 7, wherein the control unit changes the first cycle between an upper limit and a lower limit of the first cycle.

9. The apparatus according to claim 1, wherein the control unit acquires the third information and the range of the first threshold corresponding to the third information from the external apparatus and acquires the range of the second threshold.

10. The apparatus according to claim 2, wherein the information collection apparatus is an image capture apparatus, the first information is temperature information at a time of shooting, the second information is a thermal image capturing far-infrared light, the third information is a learned parameter, the inference processing using the learned model is processing to detect an object from a thermal image, the range of the first threshold is a range of temperature of the learned parameter to be applied to the learned model, and the range of the second threshold is a width from an upper limit or lower limit of the range of temperature of the learned parameter stored in the storage unit.

11. The apparatus according to claim 2, wherein the information collection apparatus is a sound recording apparatus, the first information is humidity information at a time of recording sound, the second information is operating sound of a mechanical device, the third information is a learned parameter, the inference processing using the learned model is processing to detect a fault from the operating sound, the range of the first threshold is a range of humidity of the learned parameter to be applied to the learned model, and the range of the second threshold is a width from an upper limit or lower limit of the range of humidity of the learned parameter stored in the storage unit.

12. A method of controlling an information collection apparatus which executes inference processing using a learned model, wherein the information collection apparatus includes a communication unit that communicates with an external apparatus, a first acquisition unit that acquires first information relating to a use environment of the information collection apparatus, and a second acquisition unit that acquires second information corresponding to a target for the inference processing, wherein the method comprises setting third information to be applied to the learned model on a basis of a range of a first threshold of the first information; and executing the inference processing by applying the second information and the third information to the learned model, and wherein the setting includes, in a case where the first information is within a range of a second threshold, the third information being selected on a basis of the range of the first threshold of the first information, and in a case where the first information is not within the range of the second threshold, the third information being acquired from the external apparatus via the communication unit so that the first information is within the range of the second threshold.

13. A non-transitory computer-readable storage medium storing a program for causing a computer to function as an information collection apparatus that executes inference processing using a learned model, comprising:

a communication unit that communicates with an external apparatus;

a first acquisition unit that acquires first information relating to a use environment of the information collection apparatus;

a second acquisition unit that acquires second information corresponding to a target for the inference processing;

a processing unit that executes the inference processing by applying the second information and third information set on a basis of the first information to the learned model; and a control unit that sets the third information on a basis of a range of a first threshold of the first information, wherein, in a case where the first information is within a range of a second threshold, the control unit selects the third information on a basis of the range of the first threshold of the first information, and in a case where the first information is not within the range of the second threshold, the control unit acquires the third information from the external apparatus via the communication unit so that the first information is within the range of the second threshold.

* * * * *